United States Patent
Otaka

(10) Patent No.: US 11,432,120 B2
(45) Date of Patent: Aug. 30, 2022

(54) IN-VEHICLE COMMUNICATION DEVICE, COMMUNICATION METHOD, AND STORAGE MEDIUM

(71) Applicant: HONDA MOTOR CO., LTD., Tokyo (JP)

(72) Inventor: Masaru Otaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/146,570

(22) Filed: Jan. 12, 2021

(65) Prior Publication Data
US 2021/0219114 A1 Jul. 15, 2021

(30) Foreign Application Priority Data
Jan. 14, 2020 (JP) .............................. JP2020-003800

(51) Int. Cl.
*H04W 4/46* (2018.01)
*H04W 4/48* (2018.01)

(52) U.S. Cl.
CPC ............... *H04W 4/46* (2018.02); *H04W 4/48* (2018.02)

(58) Field of Classification Search
CPC .......... H04W 4/40; H04W 4/44; H04W 4/46; H04W 4/48; G08G 1/0967;
(Continued)

(56) References Cited

U.S. PATENT DOCUMENTS

2013/0336120 A1* 12/2013 Bai ................... H04W 28/0231
370/235
2016/0121889 A1* 5/2016 Shimomura .......... B60W 50/14
701/41
(Continued)

FOREIGN PATENT DOCUMENTS

| JP | 2010-109953 | 5/2010 |
| WO | 2014/008067 | 1/2014 |
| WO | 2017/033799 | 3/2017 |

OTHER PUBLICATIONS

NPL_search (Oct. 29, 2021).*

*Primary Examiner* — Van T Trieu
(74) *Attorney, Agent, or Firm* — Amin, Turocy & Watson, LLP

(57) ABSTRACT

According to an aspect, an in-vehicle communication device includes a transmitter configured to transmit own vehicle notification information generated by an own vehicle to a nearby area, a receiver configured to receive other vehicle notification information transmitted by each of one or more other vehicles, a storage device storing a program; and a hardware processor. The hardware processor executes the program stored in the storage device to determine the other vehicle which is to communicate with the own vehicle based on one or both of the own vehicle notification information transmitted by the transmitter and the other vehicle notification information received by the receiver. The own vehicle notification information includes identification information of the own vehicle and indicator values associated with communication with the one or more other vehicles acquired by the own vehicle. The other vehicle notification information includes identification information of the other vehicle and an indicator value associated with communication with the own vehicle acquired by the other vehicle.

8 Claims, 9 Drawing Sheets

|  | OTHER VEHICLE m1 | OTHER VEHICLE m2 |
|---|---|---|
| COMMUNICATION STRENGTH ASSOCIATED WITH OWN VEHICLE WHEN VIEWED FROM OTHER VEHICLE | 9 | 5 |
| COMMUNICATION QUALITY ASSOCIATED WITH OWN VEHICLE WHEN VIEWED FROM OTHER VEHICLE | 9 | 6 |
| COMMUNICATION STRENGTH ASSOCIATED WITH OTHER VEHICLE WHEN VIEWED FROM OWN VEHICLE | 10 | 7 |
| COMMUNICATION QUALITY ASSOCIATED WITH OTHER VEHICLE WHEN VIEWED FROM OWN VEHICLE | 8 | 7 |
| SUM | 36 | 25 |

(58) Field of Classification Search
CPC .... G08G 1/096791; G08G 1/052; G08G 1/16; G08G 1/161; G08G 1/163; G08G 1/166; B60W 2556/65
See application file for complete search history.

(56) References Cited

U.S. PATENT DOCUMENTS

| | | | |
|---|---|---|---|
| 2016/0133128 A1* | 5/2016 | Koo | G08G 1/04 |
| | | | 701/117 |
| 2017/0243485 A1* | 8/2017 | Rubin | H04W 4/026 |
| 2018/0242128 A1 | 8/2018 | Kashiwase | |
| 2019/0110176 A1* | 4/2019 | Hoellerbauer | H04W 4/80 |
| 2019/0174281 A1* | 6/2019 | Lim | G08G 1/052 |
| 2020/0186981 A1* | 6/2020 | Hwang | H04W 88/04 |

\* cited by examiner

FIG. 8

|  | OTHER VEHICLE m1 | OTHER VEHICLE m2 |
|---|---|---|
| COMMUNICATION STRENGTH ASSOCIATED WITH OWN VEHICLE WHEN VIEWED FROM OTHER VEHICLE | 9 | 5 |
| COMMUNICATION QUALITY ASSOCIATED WITH OWN VEHICLE WHEN VIEWED FROM OTHER VEHICLE | 9 | 6 |
| COMMUNICATION STRENGTH ASSOCIATED WITH OTHER VEHICLE WHEN VIEWED FROM OWN VEHICLE | 10 | 7 |
| COMMUNICATION QUALITY ASSOCIATED WITH OTHER VEHICLE WHEN VIEWED FROM OWN VEHICLE | 8 | 7 |
| SUM | 36 | 25 |

IN-VEHICLE COMMUNICATION DEVICE, COMMUNICATION METHOD, AND STORAGE MEDIUM

CROSS-REFERENCE TO RELATED APPLICATION

Priority is claimed on Japanese Patent Application No. 2020-003800, filed Jan. 14, 2020, the content of which is incorporated herein by reference.

BACKGROUND

Field of the Invention

The present invention relates to an in-vehicle communication device, a communication method, and a storage medium.

Description of Related Art

Conventionally, technology for receiving notification information transmitted from a base station and providing information to each terminal present within a corresponding area based on the received notification information is known (for example, PCT International Publication No. WO 2017/033799), Japanese Unexamined Patent Application, First Publication No. 2010-109953, and PCT International Publication No. WO 2014/008067). The notification information includes information about a telecommunications carrier and information about a communication area and radio wave strength and is used as information for connecting a terminal and a base station.

SUMMARY

However, technology for determining a vehicle for performing inter-vehicle communication using notification information has not been taken into account.

The present invention has been made in consideration of the above-described circumstances and an objective of the present invention is to provide an in-vehicle communication device, a communication method, and a storage medium capable of determining a vehicle of a communication partner more appropriately using notification information.

According to the present invention, an in-vehicle communication device, a communication method, and a storage medium adopt the following configurations.

(1): According to an aspect of the present invention, there is provided an in-vehicle communication device including: a transmitter configured to transmit own vehicle notification information generated by an own vehicle to a nearby area; a receiver configured to receive other vehicle notification information transmitted by each of one or more other vehicles; a storage device storing a program; and a hardware processor, wherein the hardware processor executes the program stored in the storage device to determine the other vehicle which is to communicate with the own vehicle based on one or both of the own vehicle notification information transmitted by the transmitter and the other vehicle notification information received by the receiver, wherein the own vehicle notification information includes identification information of the own vehicle and indicator values associated with communication with the one or more other vehicles acquired by the own vehicle, and wherein the other vehicle notification information includes identification information of the other vehicle and an indicator value associated with communication with the own vehicle acquired by the other vehicle.

(2): In the above-described aspect (1), the hardware processor is configured to cause the transmitter to transmit the own vehicle notification information on a broadcast channel.

(3): In the above-described aspect (2), the hardware processor is configured to cause the transmitter to transmit the own vehicle notification information as data of a system information block on the broadcast channel.

(4): In the above-described aspects (1), the indicator value is determined based on one or both of communication strength and communication quality between the own vehicle and the other vehicle.

(5): In the above-described aspect (1), the hardware processor is configured to determine the other vehicle which is to communicate with the own vehicle based on a sum or a weighted sum of an indicator value included in the own vehicle notification information and an indicator value included in the other vehicle notification information.

(6): According to another aspect of the present invention, there is provided an in-vehicle communication device including: a receiver configured to receive other vehicle notification information transmitted by another vehicle; a storage device storing a program; and a hardware processor, wherein the hardware processor is configured to execute the program stored in the storage device to determine the other vehicle which is to communicate with the own vehicle based on the other vehicle notification information received by the receiver, and wherein the other vehicle notification information includes identification information of the other vehicle and an indicator value associated with communication with the own vehicle acquired by the other vehicle.

(7): According to yet another aspect of the present invention, there is provided a communication method including: transmitting, by a computer, own vehicle notification information generated by an own vehicle to a nearby area; receiving, by the computer, other vehicle notification information transmitted by each of one or more other vehicles; and determining, by the computer, the other vehicle which is to communicate with the own vehicle based on one or both of the transmitted own vehicle notification information and the received other vehicle notification information, wherein the own vehicle notification information includes identification information of the own vehicle and indicator values associated with communication with the one or more other vehicles acquired by the own vehicle, and wherein the other vehicle notification information includes identification information of the other vehicle and an indicator value associated with communication with the own vehicle acquired by the other vehicle.

(8): According to still another aspect of the present invention, there is provided a computer-readable non-transitory storage medium storing a program for causing a computer to: transmit own vehicle notification information generated by an own vehicle to a nearby area; receive other vehicle notification information transmitted by each of one or more other vehicles; and determine the other vehicle which is to communicate with the own vehicle based on one or both of the transmitted own vehicle notification information and the received other vehicle notification information, wherein the own vehicle notification information includes identification information of the own vehicle and indicator values associated with communication with the one or more other vehicles acquired by the own vehicle, and wherein the other vehicle notification information includes identification information of the other vehicle and an indicator value associated with communication with the own vehicle acquired by the other vehicle.

According to the above-described aspects (1) to (8), it is possible to determine a vehicle of a communication partner more appropriately using notification information.

BRIEF DESCRIPTION OF THE DRAWINGS

FIG. 8 is a diagram for describing a process in which the determiner 150 determines a vehicle of the communication partner.

DESCRIPTION OF EMBODIMENTS

Hereinafter, embodiments of an in-vehicle communication device, a communication method, and a storage medium of the present invention will be described with reference to the drawings. A communication system including a vehicle equipped with the in-vehicle communication device will be described below. The vehicle is, for example, a vehicle such as a two-wheeled vehicle, a three-wheeled vehicle, or a four-wheeled vehicle. A drive source of the vehicle is an internal combustion engine such as a diesel engine or a gasoline engine, an electric motor, or a combination thereof. The electric motor is operated using electric power generated by an electric power generator connected to the internal combustion engine or electric power with which a secondary cell or a fuel cell is discharged.

Figure 1:
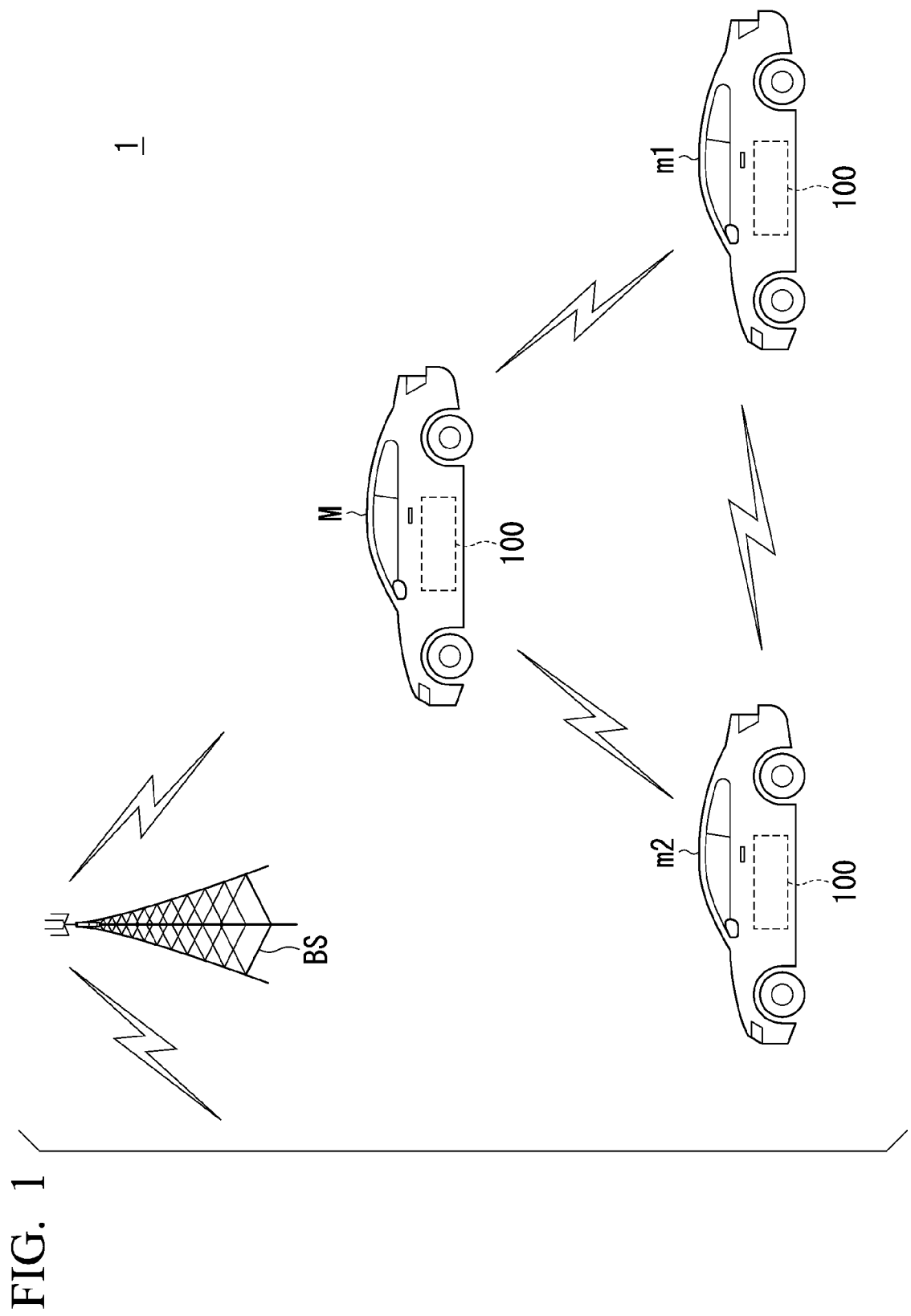
FIG. 1 is a diagram showing an example of a communication system including a vehicle equipped with an in-vehicle communication device of an embodiment.

FIG. 1 is a diagram showing an example of the communication system including the vehicle equipped with the in-vehicle communication device of the embodiment. The communication system 1 includes, for example, a base station BS and one or more vehicles. Although an own vehicle M and other vehicles m1 and m2 are present as one or more vehicles in the example of FIG. 1, the number of vehicles is not limited thereto. Each of the own vehicle M and the other vehicles m1 and m2 includes an in-vehicle communication device 100.

The base station BS communicates with vehicles (M, m1, and m2) present in an available communication area and other communication terminals. For example, the base station BS may be a base station (a primary cell (P cell)) having an available communication area of several hundred meters [m] to several kilometers [km] centered on the base station or may be a base station (a small cell (S cell)) having an available communication area of several tens of meters [m] to several hundred meters [m] centered on the base station. A plurality of S cells are installed within the P cell. Each vehicle can be connected to a plurality of S cells.

Also, the base station BS transmits notification information to the available communication area at predetermined intervals. The notification information includes a master information block (hereinafter referred to as "an MIB") and one or more system information blocks (hereinafter referred to as "SIB s"). The base station BS transmits the notification information in a plurality of blocks (the MIB and SIBs 1 to n) in accordance with a type of notification information desired to be provided. The MIB includes, for example, basic information such as a system bandwidth, a system frame number, and the number of transmission antennas. It is only necessary for the notification information to be data which is transmitted and received through inter-vehicle communication transmitted in a broadcast mode and other examples include an MIB-side link (SL), MIB-SL-vehicular-to-anything (V2X), and the like. The SIB includes specific information which is provided through notification. For example, in the SIB, data of own vehicle notification information, other vehicle notification information, various types of regulation information such as communication regulations and traffic regulations, and emergency information such as emergency earthquake and tsunami information to be described below is stored for each block. SIB 1 includes, for example, a schedule of SIB 2 to SIB n, and the in-vehicle communication device 100 can acquire notification information by acquiring each SIB according to each schedule. Also, the notification information is not limited to an MIB/SIB and general broadcast data is used as the notification information. For example, although a media access control (MAC) address may be acquired by transmitting an address resolution protocol (ARP) request in a broadcast mode when a destination address is acquired, this ARP request may be used as the notification information.

The in-vehicle communication device 100 of each of the own vehicle M and the other vehicles m1 and m2 can receive the notification information transmitted from the base station BS and acquire various types of information included in the received notification information. Also, the in-vehicle communication device 100 generates notification information on its own and transmits the generated notification information (own vehicle notification information) to a nearby area at predetermined intervals. Also, the in-vehicle communication device 100 receives notification information (other vehicle notification information) transmitted by the other vehicle and determines another vehicle which is to communicate with the own vehicle M based on one or both of the own vehicle notification information and the other vehicle notification information. Also, the in-vehicle communication device 100 transmits an inter-vehicle communication request to the determined other vehicle and executes inter-vehicle communication with the other vehicle when the request has been permitted.

[In-Vehicle Device]

Figure 2:
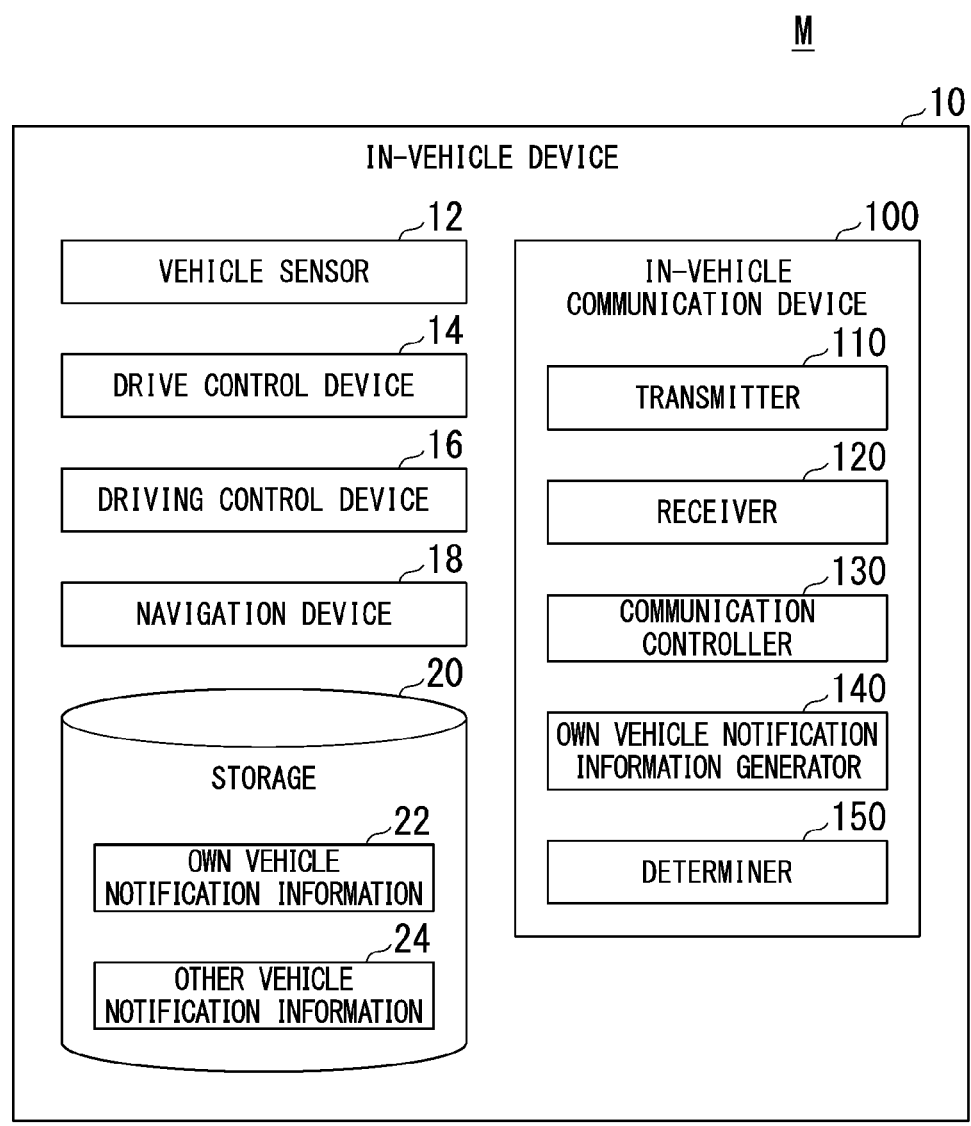
FIG. 2 is a configuration diagram of an in-vehicle device 10 including an in-vehicle communication device 100 of the embodiment.

Next, the in-vehicle device including the in-vehicle communication device 100 will be described. In particular, in-vehicle equipment mounted in the own vehicle M will be described below. FIG. 2 is a configuration diagram of an in-vehicle device 10 including the in-vehicle communication device 100 of the embodiment. The in-vehicle device 10 includes, for example, a vehicle sensor 12, a drive control device 14, a driving control device 16, a navigation device 18, a STORAGE 20, and an in-vehicle communication device 100. The in-vehicle device 10 may have a configuration other than the configuration shown in FIG. 2.

The vehicle sensor 12 includes, for example, an accelerator opening degree sensor, a vehicle speed sensor, a brake depression amount sensor, and the like. The accelerator opening degree sensor is attached to an accelerator pedal (an example of an operation element) for receiving an acceleration instruction from a driver of the own vehicle M, detects an amount of operation of the accelerator pedal, and outputs the detected amount of operation as an accelerator opening degree to the drive control device 14. The vehicle speed sensor includes, for example, a wheel speed sensor and a speed calculator attached to each wheel and combines wheel speeds detected by wheel speed sensors to derive the speed of the own vehicle M (a vehicle speed) and output the derived speed to the drive control device 14. The brake depression amount sensor is attached to a brake pedal (an example of the operation element) for receiving a deceleration or stop instruction from the driver, detects an amount of operation of the brake pedal by the driver, and outputs the detected amount of operation as an amount of brake depression to the drive control device 14.

Also, the vehicle sensor 12 includes a vehicle speed sensor configured to detect the speed of the own vehicle M, an acceleration sensor configured to detect acceleration, a yaw speed sensor configured to detect an angular speed around a vertical axis, a direction sensor configured to detect a direction of the own vehicle M, and the like.

Also, the vehicle sensor 12 may include, for example, a camera, a radar device, a light detection and ranging (LIDAR) sensor, a physical object recognition device, and the like. For example, the camera is a digital camera using a solid-state imaging element such as a charge coupled device (CCD) or a complementary metal oxide semiconductor (CMOS). The camera may be a stereo camera. The camera is attached to any location on the own vehicle M.

The radar device radiates radio waves such as millimeter waves around the own vehicle M and detects at least a position (a distance to and a direction) of a physical object located nearby by detecting radio waves (reflected waves) reflected by the physical object. The radar device is attached to any location on the own vehicle M. The radar device may detect a position and a speed of the physical object in a frequency modulated continuous wave (FM-CW) scheme.

The LIDAR sensor radiates light (or electromagnetic waves having a wavelength close to light) to the vicinity of the own vehicle M and measures scattered light. The LIDAR sensor detects a distance to an object based on a time period from light emission to light reception. The radiated light is, for example, pulsed laser light. The LIDAR sensor is attached to any location on the own vehicle M.

The physical object recognition device performs a sensor fusion process on detection results from some or all of the camera, the radar device, and the LIDAR sensor to recognize a position, a type, a speed, and the like of a physical object. The physical object recognition device outputs recognition results to the driving control device 16. Also, the physical object recognition device may output detection results of the camera, the radar device, and the LIDAR sensor to the driving control device 16 as they are. In this case, the physical object recognition device may be omitted from the own vehicle M.

The drive control device 14 is a device for giving a driving force or the like to the own vehicle M to drive the own vehicle M. The drive control device 14 includes, for example, a travel driving force output device configured to output a travel driving force (torque) for enabling the own vehicle M to travel to the drive wheels, a brake device configured to output a brake torque according to a predetermined braking operation to each wheel, and a steering device configured to change a direction of the steering wheel.

The driving control device 16 performs, for example, automated driving (autonomous driving) control, driving assistance control, and the like of the own vehicle M. The automated driving control is, for example, control of one or both of the steering or the speed of the own vehicle M without depending on a driving operation by an occupant of the own vehicle M. Also, the driving assistance control is, for example, driving control that assists the occupant in performing the driving operation such as an adaptive cruise control system (ACC), a lane keeping assistance system (LKAS), or a collision mitigation brake system (CMBS). The driving control device 16 executes driving control corresponding to behavior of the own vehicle and a control instruction from an occupant.

The navigation device 18 includes, for example, a global navigation satellite system (GNSS) receiver, a navigation human machine interface (HMI), and a route determiner. The navigation device 18 retains map information in a storage device such as a hard disk drive (HDD) or a flash memory. The GNSS receiver identifies a position of the own vehicle M based on a signal received from a GNSS satellite. The position of the own vehicle M may be identified or corrected by an inertial navigation system (INS) using an output of the vehicle sensor 12 mounted in the own vehicle M.

The navigation HMI includes a display, a speaker, a touch panel, keys, and the like. The navigation HMI allows an occupant (a user) to set a destination or the like using images, sounds, or the like, or provides the occupant to be guided with a traveling route to the destination. For example, the route determiner determines a route (hereinafter referred to as a route on a map) from the position of the own vehicle M identified by the GNSS receiver (or any input position) to a destination input by the occupant using the navigation HMI with reference to the map information. The map information is, for example, information in which a road shape is expressed by a link indicating a road and nodes connected by a link. The map information may include a curvature of a road, point of interest (POI) information, and the like.

For example, the map information includes information about a center of a lane, information about a boundary of a lane, information about a type of lane, and the like. The map information may include road information, traffic regulation information, address information (an address/postal code), facility information, telephone number information, and the like. The map information may be updated at any time by the in-vehicle communication device 100 communicating with another device. Based on the route on the map, the navigation device 18 provides route guidance and the like through a map image display process of a display and a sound output process of a speaker (not shown).

The in-vehicle communication device 100 communicates with another vehicle present near the own vehicle M using, for example, a cellular network, a Wi-Fi network, Bluetooth (registered trademark), dedicated short range communication (DSRC), or the like or communicates with various types of server devices via a radio base station. The cellular network is, for example, a third-generation mobile communication network (3G), a fourth-generation mobile communication network (4G) (Long Term Evolution: Lte (registered trademark)), a fifth-generation mobile communication network (5G), or the like. The Wi-Fi network is, for example, a radio wave communication network in which each individual or each company can freely use an own network. A communication standard in the communication scheme based on Wi-Fi has a significantly narrow arrival range of radio waves and is limited to use at about 10 to 100 [m] from an antenna position of Wi-Fi. Also, in the Wi-Fi network, communication is performed in a predetermined frequency band (for example, a band of 5 [GHz] or a band of 2.4 [GHz]).

The in-vehicle communication device 100 includes, for example, a transmitter 110, a receiver 120, a communication controller 130, an own vehicle notification information generator 140, and a determiner 150. Each component of the communication controller 130, the own vehicle notification information generator 140, and the determiner 150 is implemented by, for example, a hardware processor such as a central processing unit (CPU) executing a program (software). Some or all of these components may be implemented by hardware (including a circuit; circuitry) such as a large scale integration (LSI) circuit, an application specific integrated circuit (ASIC), a field-programmable gate array (FPGA), or a graphics processing unit (GPU) or may be implemented by software and hardware in cooperation. The program may be pre-stored in the STORAGE 20 or may be stored in a removable storage medium such as a DVD or a CD-ROM and installed in the STORAGE 20 when the storage medium is mounted in a drive device. Some or all of the components of the in-vehicle communication device 100 are examples of a telematics controller (TCU).

The STORAGE 20 is implemented by, for example, a hard disk drive (HDD), a flash memory, an electrically erasable programmable read only memory (EEPROM), a read only memory (ROM), a random access memory (RAM), or the like. The STORAGE 20 stores, for example, own vehicle notification information 22, other vehicle notification information 24, a program which is read and executed by a processor, and various other types of information. Content of the own vehicle notification information 22 and the other vehicle notification information 24 will be described below.

The transmitter 110 includes one or more transmission antennas. The transmitter 110 transmits data to the base station BS or another vehicle that performs inter-vehicle communication according to control of the communication controller 130.

Also, the transmitter 110 transmits data including the own vehicle notification information 22 generated by the own vehicle notification information generator 140 to a nearby area at predetermined intervals according to the control of the communication controller 130. The nearby area is, for example, a range within a predetermined distance centered on the own vehicle M. Also, the nearby area may be a range defined by a communication standard or the like when the own vehicle notification information 22 is transmitted. The transmitter 110 may transmit the own vehicle notification information on the broadcast channel. In this case, the transmitter 110 transmits the own vehicle notification information 22 as one of data elements of a plurality of SIBs included in the notification information on a broadcast channel Thereby, the own vehicle notification information 22 can be transmitted using the notification information.

The receiver 120 includes one or more reception antennas. The receiver 120 receives data transmitted from the base station BS or another vehicle that performs inter-vehicle communication. Also, the receiver 120 receives information transmitted from the base station BS and the other vehicle notification information 24 transmitted from each of the other vehicles m1 and m2 present in a nearby area. The other vehicle notification information 24 is data transmitted from each of the other vehicles m1 and m2 on the broadcast channel. Also, the other vehicle notification information 24 may be stored in the SIB of the notification information. Thereby, the other vehicle notification information 24 can be received from the notification information. The received other vehicle notification information 24 is stored in the STORAGE 20 or output to the determiner 150.

The communication controller 130 controls the transmission of data by the transmitter 110 and the reception of data from the outside by the receiver 120. For example, the communication controller 130 causes the transmitter 110 to transmit the notification information including the own vehicle notification information 22 generated by the own vehicle notification information generator 140 at predetermined intervals. Transmitting at predetermined intervals as described above may be referred to as "beacon transmission." In this case, the communication controller 130 performs communication using a communication scheme based on any one of the cellular network, the Wi-Fi network, Bluetooth, and the DSRC. Also, the communication controller 130 performs control for causing a communication request for a vehicle of the communication partner which performs inter-vehicle communication determined by the determiner 150 to be transmitted from the transmitter 110 or performs control for performing inter-vehicle communication with the vehicle of the communication partner based on the communication permission received by the receiver 120.

The own vehicle notification information generator 140 generates the own vehicle notification information 22 transmitted by the own vehicle M on the broadcast channel. For example, the own vehicle notification information 22 includes identification information for identifying the own vehicle M and an indicator value associated with communication with one or more other vehicles (m1, m2) acquired by the own vehicle M. For example, the own vehicle notification information generator 140 determines an indicator value based on one or both of communication strength (reference signal received power (RSRP) and communication quality (reference signal received quality (RSRQ)). The own vehicle notification information generator 140 may cause the generated own vehicle notification information to be stored in the STORAGE 20, may cause the generated own vehicle notification information to be output to the determiner 150, or may cause the transmitter 110 to transmit the generated own vehicle notification information to the nearby area.

The determiner 150 determines the other vehicle (the vehicle of the communication partner) which performs inter-vehicle communication based on one or both of the own vehicle notification information 22 generated by the own vehicle notification information generator 140 and the other vehicle notification information 24 received by the receiver 120. Details of the functions of the own vehicle notification information generator 140 and the determiner 150 will be described below.

[Hardware Configuration of in-Vehicle Communication Device]

Figure 3:
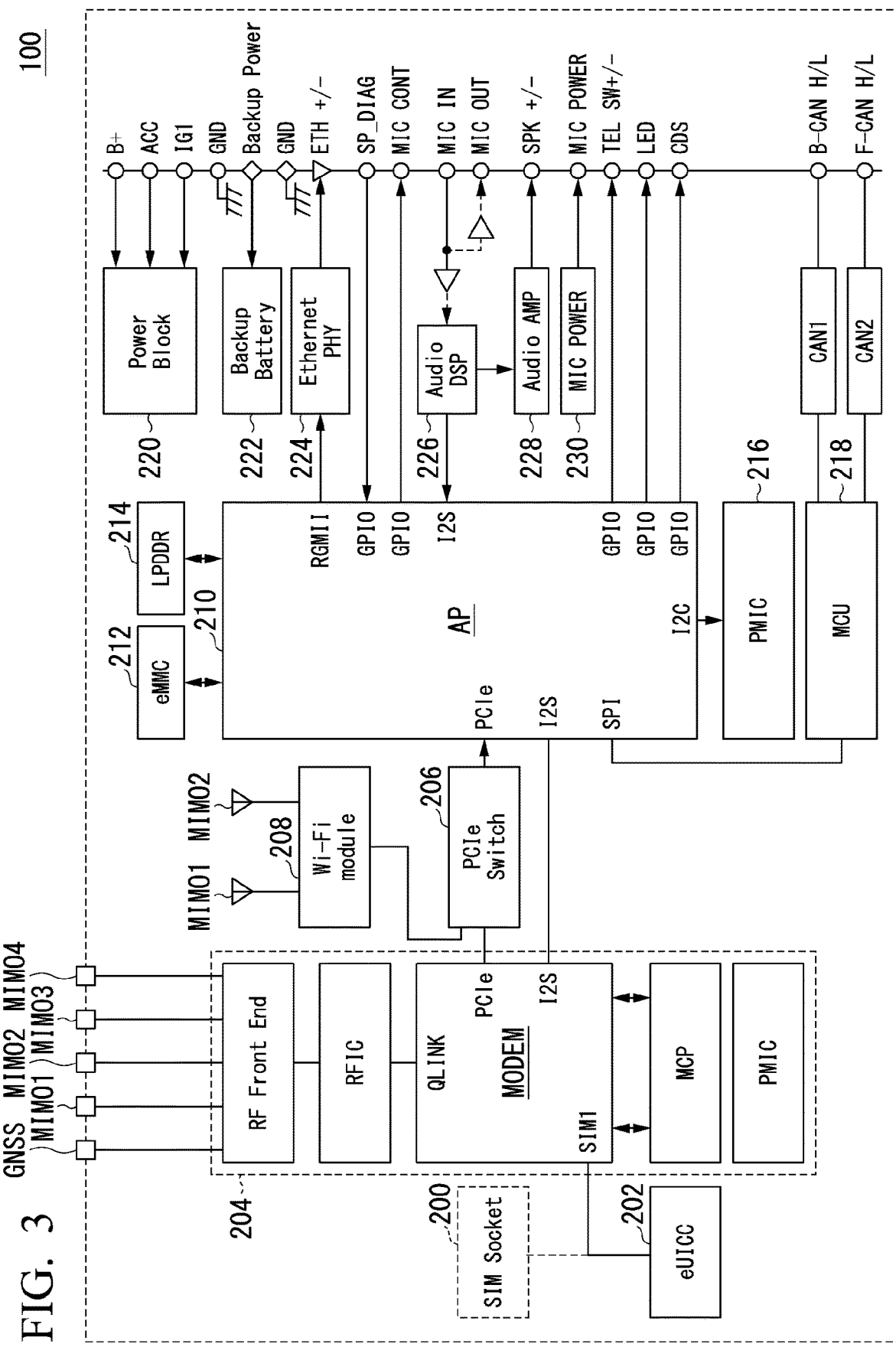
FIG. 3 is a hardware configuration diagram of the in-vehicle communication device 100 of the embodiment.

FIG. 3 is a hardware configuration diagram of the in-vehicle communication device 100 of the embodiment. In FIG. 3, the in-vehicle communication device 100 includes a subscriber identity module (SIM) socket 200, an embedded universal integrated circuit card (eUICC) 202, a modem module 204, a peripheral component interconnect express (PCIe) switch 206, a Wi-Fi module 208, an application processor (AP) 210, an embedded multimedia card (eMMC) 212, a low power double data rate (LPDDR) 214, a power management integrated circuit (PMIC) 216, a micro controller unit (MCU) 218, a power block 220, a backup battery 222, an Ethernet (registered trademark) physical (PHY) component 224, an audio digital signal processor (DSP) 226, an audio amplifier 228, and a microphone power component 230. A general-purpose input/output (GPIO) shown in FIG. 3 is an input/output unit for a general purpose.

The SIM socket 200 removably accommodates a SIM card for connecting to a telecommunications carrier's cellular network (wireless network) or the like. A memory of the SIM card includes user profile information for performing communication using the network of the telecommunications carrier. The eUICC 202 is a microchip that encrypts the user profile information and stores the encrypted user profile information in a memory, and is also used for network authentication and the like. It is only necessary for the in-vehicle communication device 100 to include at least one of the SIM card and the eUICC 202. For example, the SIM card is used at the time of debugging of the in-vehicle communication device 100 and the like.

The modem module 204 includes, for example, a radio frequency (RF) front end, an RF integrated circuit (RFIC), a modem (MODEM), an multi chip package (MCP), and a PMIC. The RF front end is a chip that inputs and outputs signals related to an RF. Because the RF front end is connected to, for example, the GNSS receiver or a plurality of multiple input multiple output (MIMO) components, a plurality of signals can be input and output at the same time. The RFIC is an integrated circuit that controls the input and output of RF signals. The MODEM digitally modulates a digital signal into an analog signal suitable for characteristics of a transmission line to transmit the analog signal from the RF front end and demodulates an analog signal from the transmission line into a digital signal for reception. When communication is performed using a network of a telecommunications carrier, the communication is performed after the user profile information is acquired from the SIM card or the eUICC 202 accommodated in the SIM socket 200 and network authentication is performed. In the MCP, each of a plurality of chips built into the package performs various types of processes related to communication control. The PMIC is an integrated circuit that manages power within the modem module 204. For example, the PMIC controls the power supply of a multi-channel DC-DC converter, a power saving function, a protection circuit, or the like. The modem module 204 performs communication based on an I2S standard with the AP 210.

The PCIe switch 206 is an input/output serial interface and switches data output from the modem module 204 to the Wi-Fi module 208 or the AP 210 and outputs the data thereto. Also, the PCIe switch 206 switches data output from the Wi-Fi module to the modem module 204 or the AP 210 and outputs the data thereto.

For example, the Wi-Fi module 208 is a module for use in a case in which an optimum communication partner is determined in the embodiment and a function of executing inter-vehicle communication with the determined communication partner (a communication optimization function) is executed. The Wi-Fi module 208 is connected to a transmission antenna and a reception antenna. As the antenna, an antenna for continuously transmitting/receiving notification information on the broadcast channel and a transmission/reception antenna for performing inter-vehicle communication with a vehicle or the like of a communication partner may be provided separately. Also, the antenna may be built into the in-vehicle communication device 100 or may be provided externally. Also, the Wi-Fi module 208 may communicate with a terminal device owned by an occupant within the vehicle.

The AP 210 controls a large number of hardware or software components connected to the AP 210. For example, the AP 210 executes application software to be described below to implement various types of functions and performs a process or an operation on various types of data including multimedia data. The AP 210 includes, for example, a system on chip (SoC), and may also include a GPU. Also, the AP 210 controls the switching of an ON/OFF switch of a phone, an ON/OFF of a light emitter such as a light emitting diode (LED), and the like.

The eMMC 212 is an interface card for a NAND type flash memory mounted on a board, and data is stored in a memory within the card. The LPDDR 214 is a volatile memory to or from which data can be written or read in a power saving mode. The PMIC 216 is an integrated circuit that performs power management related to the AP 210. The PMIC 216 controls the power supply of a multi-channel direct current (DC)-DC converter, a power saving function, a protection circuit, or the like. The MCU 218 performs a part of a process which is performed by the AP 210 or performs a process for a specific function. In the example of FIG. 3, the MCU 218 controls communication in controller area network (CAN) communication. In the example of FIG. 3, CAN 1 is a communicator (a transceiver (XCVR)) that performs communication through a B-CAN (for example, 33 Kbps) interface and CAN 2 is a communicator that performs communication through an F-CAN (for example, 500 Kbps) interface.

The power block 220 is a power supply circuit that supplies electric power to the in-vehicle communication device 100. The backup battery 222 is an auxiliary power supply circuit of the power block 220 and supplements electric power when the power supply is insufficient. The Ethernet PHY component 224 converts a logic signal input by a reduced gigabit media independent interface (RGMII) into an actual electrical signal and outputs the electrical signal. The audio DSP 226 is, for example, a processor that controls an audio signal input from a microphone (MIC) or the like. The audio amplifier 228 is an amplifier that amplifies a sound signal. A sound amplified by the audio amplifier 228 is output from a speaker (SPK) or the like.

The microphone power component 230 supplies electric power to the microphone or the like and inputs a sound or the like.

[System Architecture of in-Vehicle Communication Device]

Figure 4:
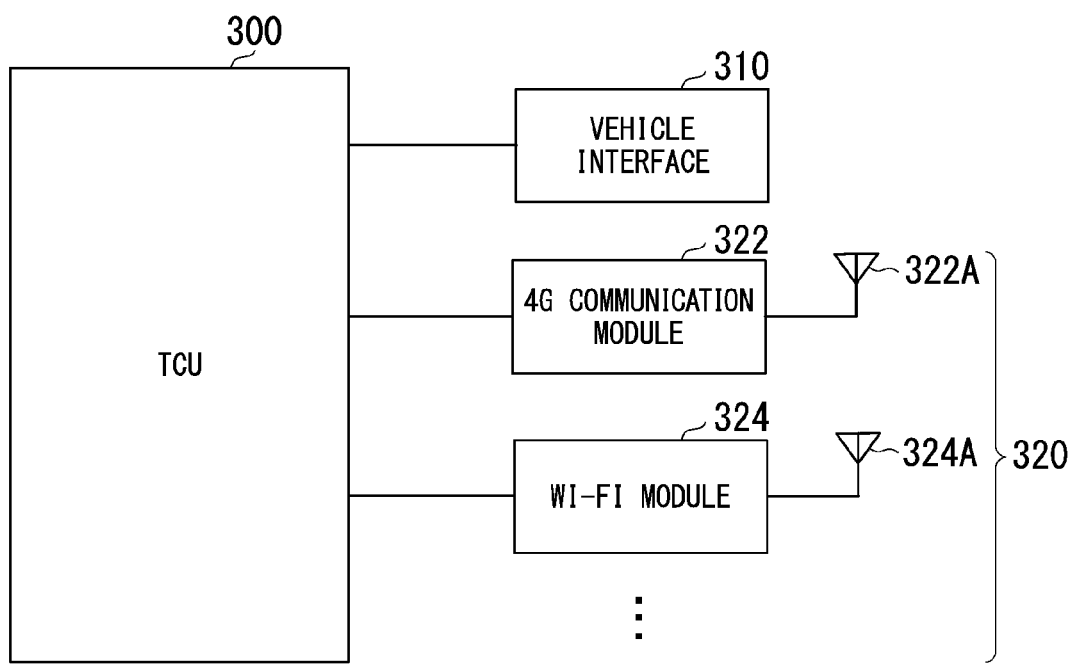
FIG. 4 is a diagram for describing a system architecture of the in-vehicle communication device 100.

FIG. 4 is a diagram for describing the system architecture of the in-vehicle communication device 100. In the example of FIG. 4, the in-vehicle communication device 100 of the embodiment shows a configuration including a basic architecture for implementing a communication optimization function. In the example of FIG. 4, a TCU 300, a vehicle interface 310, and a plurality of communication modules 320 are shown as a partial outline configuration of the in-vehicle communication device 100.

The TCU 300 is connected to the vehicle interface 310 and transmits/receives data to/from the vehicle sensor 12, the drive control device 14, the driving control device 16, the navigation device 18, and the like mounted in the own vehicle M.

Also, the TCU 300 is connected to a plurality of communication modules (communication means) 320 having different communication methods. The TCU 300 is connected to, for example, a 4G communication module 322 and a Wi-Fi module 324. In the example of FIG. 4, the TCU 300 causes the 4G communication module 322 to execute communication control through a cellular network based on a communication standard of 4G communication (Lte) or performs communication through a communication antenna 322A. Also, the TCU 300 causes the Wi-Fi module 324 to execute communication control or performs communication through a Wi-Fi antenna 324A. Here, a plurality of Wi-Fi antennas 324A may be provided. For example, the Wi-Fi module 324 performs communication based on a communication standard 802.11n and performs communication within an available communication range of about 10 to 100 [m]. For example, the Wi-Fi module 324 corresponds to the Wi-Fi module 208 shown in FIG. 3. Also, the TCU 300 controls switching of data to be input/output with respect to communication using a cellular network and communication using a Wi-Fi network so that switching is appropriately performed between the communication using the cellular network and the communication using the Wi-Fi network. Various types of communication modules are not limited to the above examples and may include, for example, a communication module in which Ethernet communication based on the communication standard of 100 Base-T1 is enabled or may include a communication module in which communication based on other communication standards is enabled.

[Software Configuration of in-Vehicle Communication Device]

Figure 5:
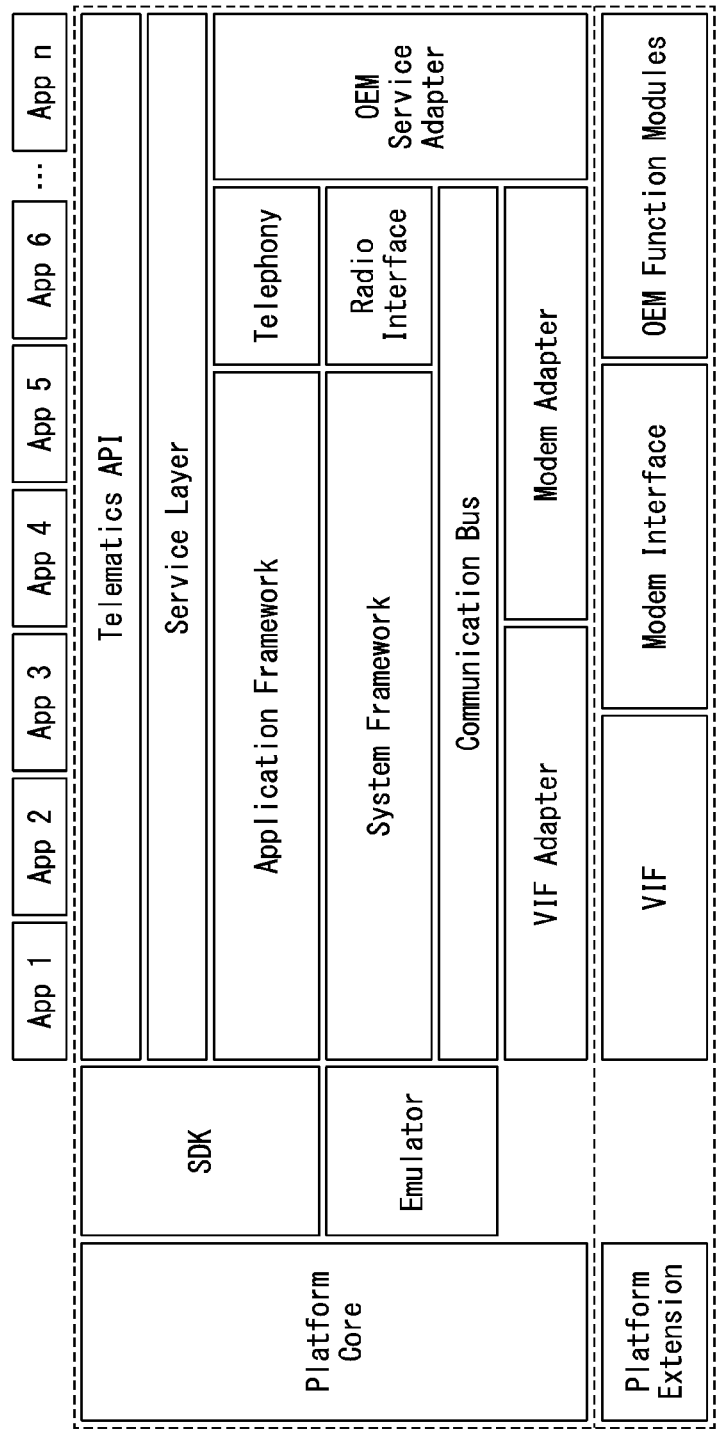
FIG. 5 is a configuration diagram of application software provided in the in-vehicle communication device 100 of the embodiment.

FIG. 5 is a configuration diagram of application software included in the in-vehicle communication device 100 of the embodiment. In the example of FIG. 5, a platform core and a platform extension for each of one or more pieces of application software (App 1 to App n) provided in the in-vehicle communication device 100 are shown. The platform core includes, for example, a software development kit (SDK) and an emulator. Also, the platform core includes, for example, a telematics application programming interface (API), a service layer, an application framework, a system framework, telephony, a radio interface, a communication bus, various types of adapters (a virtual interface (VIF) adapter, a modem adapter, and an original equipment manufacturer (OEM) service adapter) and the like. The telematics API is, for example, an API for providing various types of services using a communication system including the in-vehicle communication device 100. Various types of services may include a service for determining a more optimum communication partner, a service for providing data to each vehicle through inter-vehicle communication, a service for transmitting vehicle information detected by the vehicle sensor 12 or the like to a server for management, a service for acquiring information about a traveling route to a destination or driving assistance from a server, and the like.

Also, the platform extension includes, for example, a VIF, a modem interface, and an OEM function module. The functions of each application are executed by combining the above-mentioned elements according to, for example, a function of each application (App) and the like.

Figure 6:
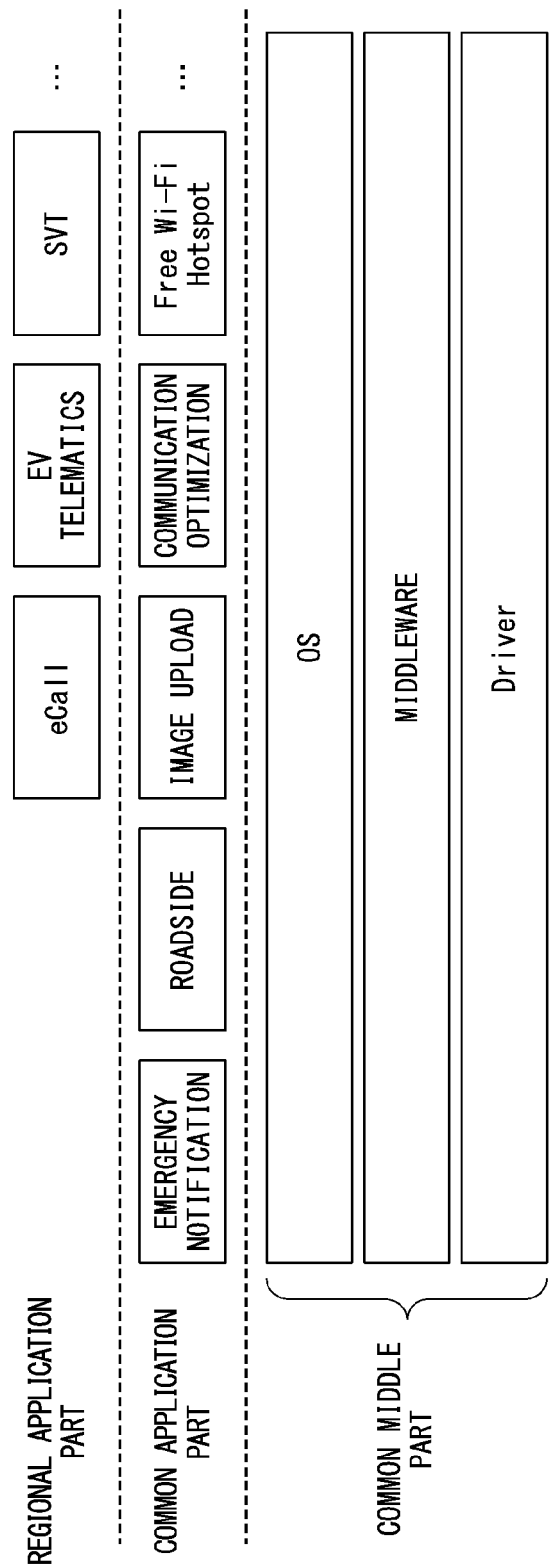
FIG. 6 is a diagram showing an example of a hierarchical structure of application software provided in the in-vehicle communication device 100 of the embodiment.

FIG. 6 is a diagram showing an example of a hierarchical structure of application software included in the in-vehicle communication device 100 of the embodiment. In the example of FIG. 6, a common middle part, a common application part, and a regional application part are shown. In the example of FIG. 6, the regional application part is the highest layer and the common application part and the common middle part are lower layers in that order. Also, in the example of FIG. 6, a microcomputer may be provided as a lower layer (a hardware layer) of the common middle part. The common middle part has a driver, middleware, and an operating system (OS) in order from the lowest layer. The driver is software that defines an application programming interface (API) for controlling a device. The middleware is, for example, software located between the driver and the OS. The middleware includes, for example, a protocol stack, a file system, a codec, and a graphic library required for communication of Ethernet, a USB, or the like. The OS is basic software for improving the versatility of applications and middleware by abstracting hardware and eliminating device dependencies.

The common application part is application software for the in-vehicle device 10 to communicate with the outside for each of various types of functions. In the example of FIG. 6, the common application part includes, for example, application software associated with an emergency notification function, a roadside information providing function, an image upload function, a communication optimization function, a free Wi-Fi communication function, a hotspot communication function, and the like. For example, the free Wi-Fi communication function and the hotspot communication function are functions of receiving information about access spots of a wireless LAN and Bluetooth present near the own vehicle M, causing the display to display the access spot on the display, providing the guidance of a route to the access spot, and the like.

The regional application part is an application program for implementing a function permitted within a region or a function capable of being executed by a specific vehicle according to the communication standard for each region. The specific vehicle is, for example, a vehicle that travels using electric power supplied from an in-vehicle battery (a secondary battery) such as an electric vehicle (EV) or a hybrid electric vehicle (HEV). In the example of FIG. 6, for example, application software associated with an automated emergency notification system (eCall) that has been put into practical use in regions such as Russia and the European Union (EU), a telematics system that provides a route via a charging station that charges a battery in an electric vehicle, and a stolen vehicle tracking (SVT) system provided in a region such as Brazil is included as the regional application part.

In the present embodiment, it is possible to execute various types of applications in the hardware configuration and the system architecture that have been described above by specifying an API for compiling and incorporating various types of applications such as a communication optimization function, a free Wi-Fi function, and a hotspot function for the OS in the common application part. The in-vehicle communication device 100 implements various types of functions in the in-vehicle communication device 100 by executing the various types of applications described above.

[Functions of Own Vehicle Notification Information Generator and Determiner]

Next, details of the functions of the own vehicle notification information generator 140 and the determiner 150 will be described.

Figure 7:
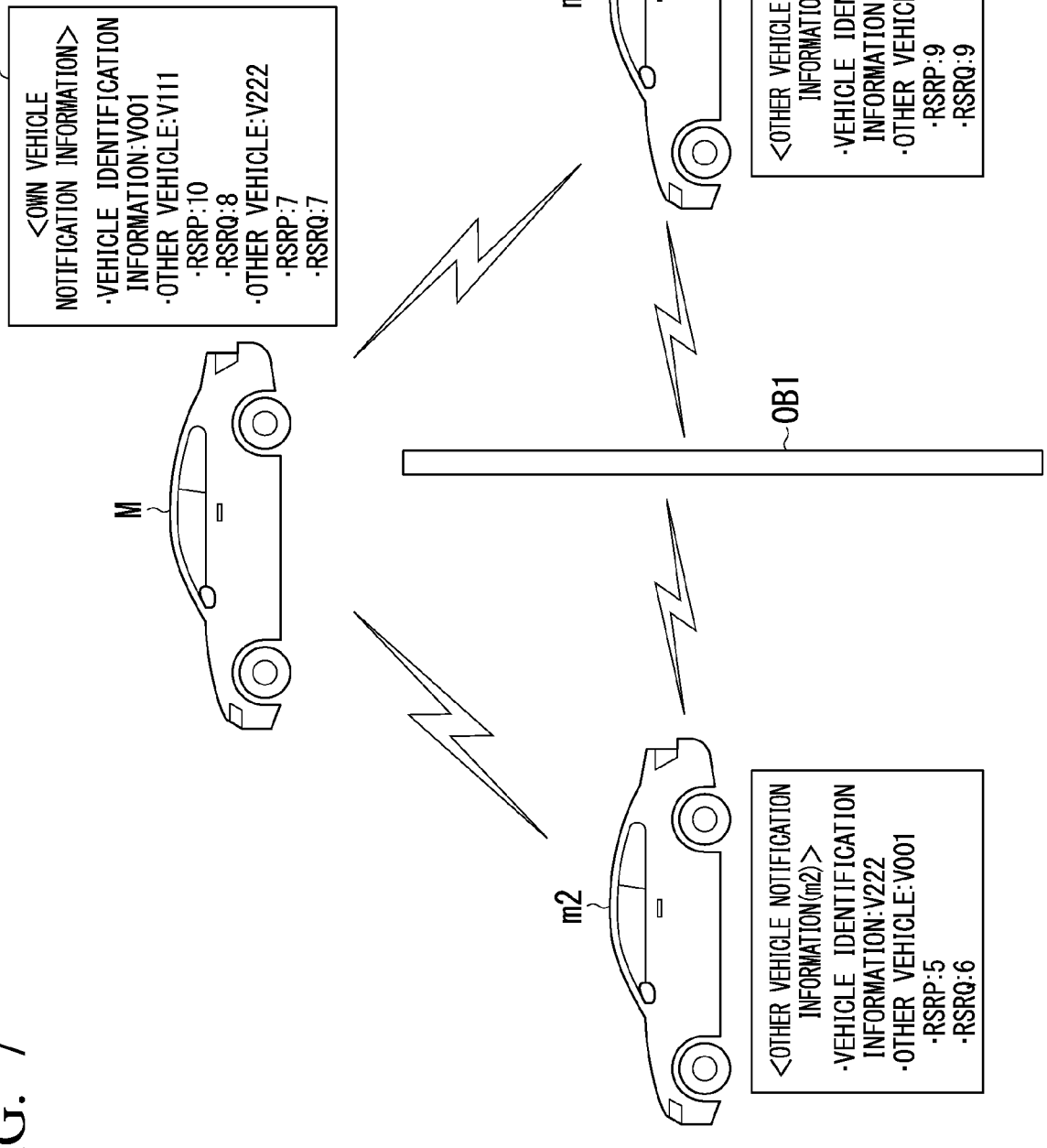
FIG. 7 is a diagram for describing a process in which a determiner 150 determines a communication partner for inter-vehicle communication.

Some or all of the functions of the own vehicle notification information generator 140 and the determiner 150 are examples of the communication optimization function. FIG. 7 is a diagram for describing a process in which the determiner 150 determines a communication partner for inter-vehicle communication. Hereinafter, an example in which the determiner 150 of the own vehicle M determines the communication partner will be described. Also, in the example of FIG. 7, it is assumed that there is an obstacle OB1 that blocks a propagation path of radio waves from another vehicle m1 to another vehicle m2.

The own vehicle notification information generator 140 dynamically generates the own vehicle notification information 22 at predetermined intervals (for example, 100 [msec]). When the own vehicle notification information 22 is generated, the own vehicle notification information generator 140 first determines indicator values associated with communication with the other vehicles m1 and m2. For example, the own vehicle notification information generator 140 acquires communication performance when the receiver 120 receives the other vehicle notification information (m1, m2) included in the notification information transmitted from each of the other vehicles m1 and m2.

For example, the communication performance includes information of one or both of communication strength (RSRP) and communication quality (RSRQ). For example, the RSRP is electric power of a part or an average in electric power serving as a reference signal among radio waves received by the antenna of the receiver 120.

Also, the RSRQ is derived from, for example, an equation of "RSRQ=RSRP×RBs/RSSI." For example, RBs correspond to the number of resource blocks per bandwidth of a signal received by an antenna of the receiver 120 (hereinafter referred to as a "reception antenna"). A received signal strength indicator (RSSI) is, for example, the strength (electric power) of radio waves per bandwidth received by the reception antenna. Information about communication strength (RSRP) and communication quality (RSRQ) may be included in notification information in which the other vehicle notification information is stored.

Also, for example, the communication performance may include information of throughput, a communication response, and the like. The throughput is, for example, an effective amount of transmission per unit time of a communication circuit. For example, the communication response has a time period from the time when a request is transmitted to the time when a response is received. The own vehicle notification information generator 140 acquires the throughput by receiving the other vehicle notification information transmitted from the other vehicles m1 and m2 at predetermined intervals. Also, the own vehicle notification information generator 140 transmits request information to each of the other vehicles m1 and 2, receives a response thereof, and acquires a communication response.

The own vehicle notification information generator 140 determines indicator values associated with communication with another vehicle when viewed from the own vehicle M based on the acquired communication performance. For example, the own vehicle notification information generator 140 determines indicator values associated with one or both of the communication strength and the communication quality. Also, when an indicator value for each of a plurality of information elements acquired as the communication performance is determined, the own vehicle notification information generator 140 may normalize the indicator value for each information element. For example, when indicator values for values of the communication strength and the communication quality are determined, the own vehicle notification information generator 140 normalizes minimum and maximum values of the indicator values so that they have the same indicator value. For example, the own vehicle notification information generator 140 determines the indicator value so that the minimum value is 0 and the maximum value is 10 in accordance with the values of the communication strength and the communication quality. Thereby, it is possible to restrict a communication destination from being determined biased toward information having larger value in the communication performance and it is possible to determine a vehicle of a more appropriate communication partner.

The own vehicle notification information generator 140 generates the own vehicle notification information 22 including the identification information of the own vehicle M and the above-mentioned indicator value. In the example of FIG. 7, the own vehicle notification information 22 includes vehicle identification information "V001," indicator values (RSRP: 10, RSRQ: 8) associated with communication between the own vehicle and other vehicle m1, and indicator values (RSRP: 7, RSRQ: 7) associated with communication between the own vehicle and other vehicle m2.

The own vehicle notification information generator 140 includes the generated own vehicle notification information 22 in the SIB of the notification information and causes the notification information to be transmitted to a nearby area on the broadcast channel. The own vehicle notification information generator 140 may newly create the notification information or may use the notification information received from the base station.

In the example of FIG. 7, the other vehicle notification information (m1) received by the receiver 120 includes vehicle identification information "V111" of the other vehicle m1 and indicator values (RSRP: 9, RSRQ: 9) associated with communication with the own vehicle M, which is another vehicle, when viewed from the other vehicle m1. Also, the other vehicle notification information (m2) of the other vehicle m2 received by the receiver 120 includes vehicle identification information "V222" of the other vehicle m2 and indicator values (RSRP: 5, RSRQ: 6) associated with communication with the own vehicle M, which is another vehicle, when viewed from the other vehicle m2. In the embodiment, for example, the indicator values included in the other vehicle identification information (m1 and m2) are set based on a reference which is the same as that of the indicator value set by the own vehicle notification information generator 140.

The determiner 150 determines the vehicle of the communication partner based on one or both of the own vehicle notification information 22 generated by the own vehicle notification information generator 140 and the other vehicle identification information (m1 and m2). FIG. 8 is a diagram for describing a process in which the vehicle of the communication partner is determined by the determiner 150. In the example of FIG. 8, indicator values of "communication strength associated with the own vehicle when viewed from the other vehicle," "communication quality associated with the own vehicle when viewed from the other vehicle," "communication strength associated with the other vehicle when viewed from the own vehicle," and "communication quality associated with the other vehicle when viewed from the own vehicle" are shown for each of the other vehicles m1 and m2. The "communication strength associated with the own vehicle when viewed from the other vehicle" and the "communication quality associated with the own vehicle when viewed from the other vehicle" are indicator values included in the other vehicle notification information. The "communication strength associated with the other vehicle when viewed from the own vehicle" and the "communication quality associated with the other vehicle when viewed from the own vehicle" are indicator values included in the own vehicle notification information.

The determiner 150 calculates a sum of indicator values associated with communication with each of the other vehicles m1 and m2 and determines the other vehicle having the largest calculated value as the vehicle of the communication partner. In the example of FIG. 8, a total indicator value of "36" associated with communication with the other vehicle m1 and a total indicator value of "25" associated with communication with the other vehicle m2 are shown. In the example of FIG. 8, the determiner 150 determines the vehicle of the communication partner of the inter-vehicle communication as the other vehicle m1.

Also, the determiner 150 may obtain a sum of indicator values included in the other vehicle notification information for each of the other vehicles to determine the vehicle of the communication partner. Thereby, a more appropriate communication partner can be determined without generating the own vehicle notification information.

Also, the determiner 150 may obtain a sum of indicator values included in the own vehicle notification information for each of the other vehicles to determine the vehicle of the communication partner. Thereby, it is possible to determine a more appropriate communication partner in a situation where the other vehicle notification information cannot be received.

Also, the determiner 150 may obtain a sum of only indicator values of the communication strength for each of the other vehicles or a sum of only indicator values of the communication quality for each of the other vehicles to determine the vehicle of the communication partner. Also, the determiner 150 may select one or more communication performance elements based on the number of other vehicles present nearby, a traffic status (congestion or the like), a speed of the own vehicle, and the like among a plurality of communication performance elements (for example, communication strength, communication quality, throughput, and a communication response) and determine the vehicle of the communication partner using an indicator value of the selected communication performance element. Also, the determiner 150 may calculate a weighted sum instead of calculating a sum of indicator values for each of the other vehicles and determine the vehicle of the communication partner based on a calculation result.

Also, the determiner 150 does not have to determine another vehicle of the communication partner when the sum of indicator values or the weighted sum is less than or equal to a threshold value. Thereby, it is possible to restrict inter-vehicle communication with another vehicle from being performed in a poor communication environment. In this case, the determiner 150 may determine to communicate with the base station without performing inter-vehicle communication.

The communication controller 130 transmits a communication request to the vehicle of the communication partner determined by the determiner 150 and performs inter-vehicle communication with a target vehicle when communication permission has been obtained. The determiner 150 also continuously executes a communication destination determination process during inter-vehicle communication with the vehicle of the communication partner (for example, the other vehicle m1) and performs communication with a vehicle of a new communication partner when the vehicle of the communication partner is determined to be a vehicle other than the other vehicle m1.

Thereby, it is possible to determine a vehicle of a more appropriate communication partner and perform communication with the determined vehicle in inter-vehicle communication in which an environment of communication with a nearby vehicle is likely to change due to the movement of the own vehicle or another vehicle.

[Processing Sequence]

Figure 9:
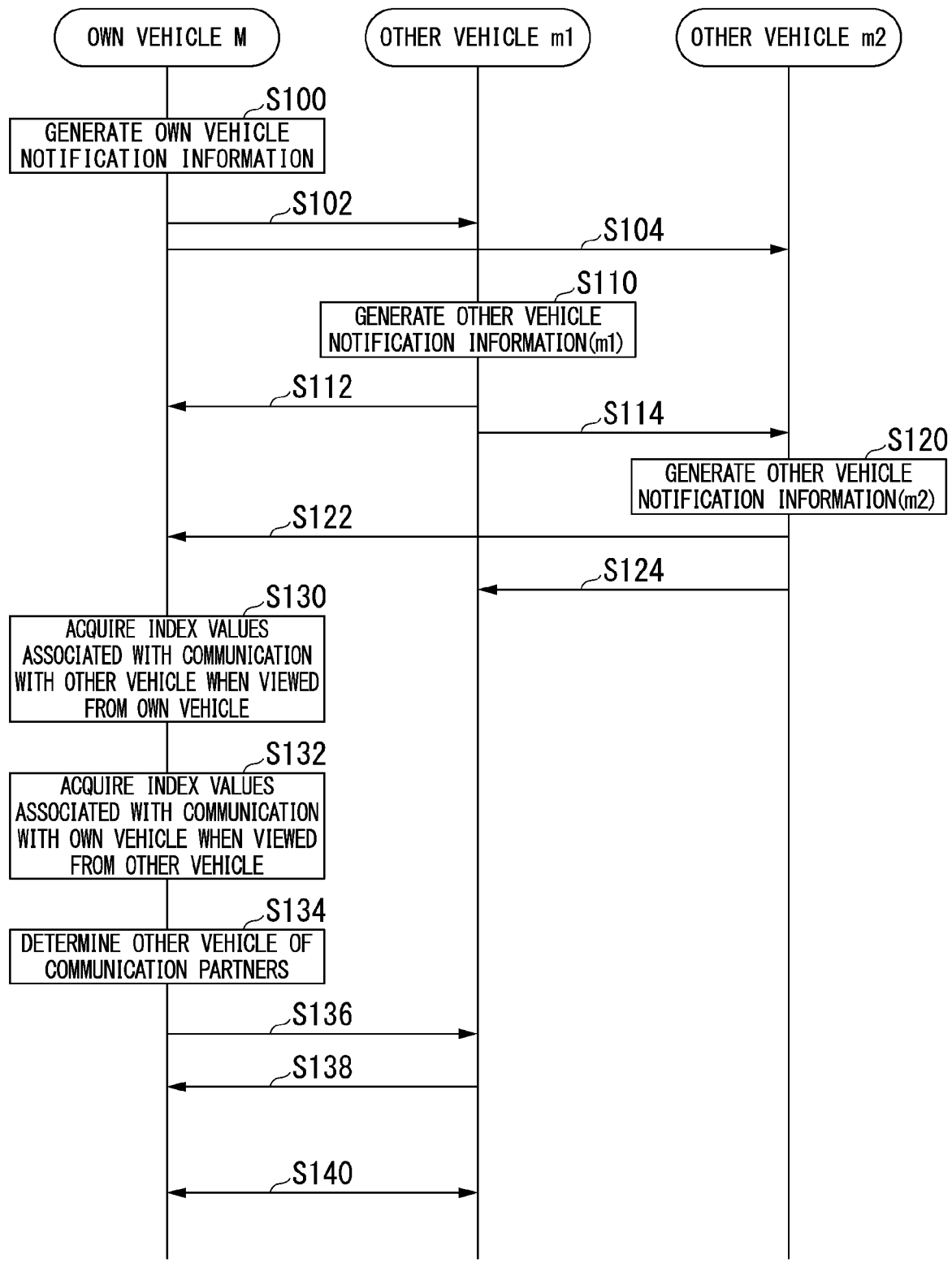
FIG. 9 is a sequence diagram showing an example of a process executed by a communication system 1 according to the embodiment.

FIG. 9 is a sequence diagram showing an example of a process executed by the communication system 1 according to the embodiment. Hereinafter, a flow of a process of determining the vehicle of the communication partner will be mainly described using the own vehicle M and the other vehicles m1 and m2. The own vehicle M and the other vehicles m1 and m2 are vehicles present within an available communication area. Also, it is assumed that the in-vehicle communication device 100 is mounted in each of the own vehicle M and the other vehicles m1 and m2.

In the example of FIG. 9, the own vehicle M generates own vehicle notification information at first predetermined intervals (step S100), stores the generated own vehicle notification information 22 in an SIB of notification information, and transmits the own vehicle notification information 22 to a nearby area on a broadcast channel (first beacon transmission). Because the other vehicles m1 and m2 are within an available communication range of the own vehicle M, the own vehicle notification information 22 is consequently transmitted to each of the other vehicles m1 and m2 (steps S102 and S104).

The other vehicle m1 generates other vehicle notification information (m1) at second predetermined intervals (step S110), stores the generated other vehicle notification information (m1) in an SIB of the notification information, and transmits the other vehicle notification information (m1) to a nearby area on a broadcast channel (second beacon transmission). Because the own vehicle M and the other vehicle m2 are within the available communication range of the other vehicle m1, the other vehicle notification information (m1) is consequently transmitted to the own vehicle M and the other vehicle m2 (steps S112 and S114).

The other vehicle m2 generates other vehicle notification information (m2) at third predetermined intervals (step S120), stores the generated other vehicle notification information (m2) in an SIB of the notification information, and transmits the other vehicle notification information (m2) to a nearby area on a broadcast channel (third beacon transmission). Because the own vehicle M and the other vehicle m1 are within the available communication range of the other vehicle m2, the other vehicle notification information (m2) is consequently transmitted to the own vehicle M and the other vehicle m1 (steps S122 and S124). The first to third predetermined intervals described above may be the same as each other or may be different intervals.

The own vehicle M continuously executes the processing of steps S100 to S104 regardless of whether or not communication with the base station or inter-vehicle communication is being executed. Also, likewise, the other vehicle m1 continuously executes the processing of steps S110 to S114 regardless of whether or not the communication with the base station or inter-vehicle communication is being executed and the other vehicle m2 continuously executes the processing of steps S120 to S124 regardless of whether or not the communication with the base station or inter-vehicle communication is being executed. Therefore, each of the own vehicle M and the other vehicles m1 and m2 receives the notification information of the other vehicle at predetermined intervals while they are in the available communication area of the notification information.

Next, the own vehicle M acquires indicator values associated with communication with other vehicles m1 and m2 when viewed from the own vehicle M included in the own vehicle notification information 22 (step S130). Also, the own vehicle M acquires indicator values associated with communication with the own vehicle M when viewed from each of the other vehicles m1 and m2 included in the other vehicle notification information (step S132). The own vehicle M determines another vehicle of the communication partner based on the acquired indicator values (step S134). In the example of FIG. 9, it is assumed that the other vehicle m1 is determined to be the communication partner.

Next, the own vehicle M transmits a communication request to the other vehicle m1 (step S136) and receives a response to the request (step S138). If the response is information indicating communication permission, inter-vehicle communication is performed between the own vehicle M and the other vehicle m1 (step S140). The own vehicle M also continuously executes the processing of steps S130 to S134 described above during inter-vehicle communication. When a vehicle other than the vehicle, which is performing the inter-vehicle communication, is determined to be the vehicle of the communication partner, the own vehicle M transmits a communication request to the vehicle. When communication has been permitted, the own vehicle M switches a communication destination to perform communication.

According to the above-described embodiment, there is provided an in-vehicle communication device including the transmitter 110 configured to transmit own vehicle notification information generated by the own vehicle M to a nearby area; the receiver 120 configured to receive other vehicle notification information transmitted by each of one or more other vehicles; and a determiner configured to determine the other vehicle which is to communicate with the own vehicle M based on one or both of the own vehicle notification information transmitted by the transmitter 110 and the other vehicle notification information received by the receiver 120, wherein the own vehicle notification information includes identification information of the own vehicle M and indicator values associated with communication with the one or more other vehicles acquired by the own vehicle M, and wherein the other vehicle notification information includes identification information of the other vehicle and an indicator value associated with communication with the own vehicle acquired by the other vehicle, so that it is possible to determine a vehicle of a communication partner (a paring target) more appropriately.

Also, according to the present embodiment, more appropriate inter-vehicle communication can be implemented by including the own vehicle notification information or the other vehicle notification information in the notification information conventionally transmitted from the base station and causing the notification information to be transmitted from the vehicle. Also, according to the embodiment, because the information can be acquired through the inter-vehicle communication without communicating with the base station, a usage fee for the base station can be reduced.

In the present embodiment, a more appropriate inter-vehicle communication route can be set by determining the vehicle of the communication partner in the above-described method for each of a plurality of vehicles and performing inter-vehicle communication. Therefore, information can be transmitted and received via a plurality of vehicles. Also, even if there is no base station nearby, various types of information can be shared through inter-vehicle communication with other vehicles. Also, the communication system 1 of the present embodiment may include a communication device such as a smartphone or a tablet terminal instead of (or in addition to) the vehicle.

The above-described embodiment can be implemented as follows.

An in-vehicle communication device including:
a storage device storing a program; and
a hardware processor,
wherein the hardware processor executes the program stored in the storage device to:
transmit own vehicle notification information generated by an own vehicle to a nearby area;
receive other vehicle notification information transmitted by each of one or more other vehicles; and
determine the other vehicle which is to communicate with the own vehicle based on one or both of the transmitted own vehicle notification information and the received other vehicle notification information,
wherein the own vehicle notification information includes identification information of the own vehicle and indicator values associated with communication with the one or more other vehicles acquired by the own vehicle, and
wherein the other vehicle notification information includes identification information of the other vehicle and an indicator value associated with communication with the own vehicle acquired by the other vehicle.

Although modes for carrying out the present invention have been described above using the embodiments, the present invention is not limited to the embodiments and various modifications and replacements can be made without departing from the spirit and scope of the present invention.

What is claimed is:

1. An in-vehicle communication device comprising:
a transmitter configured to transmit own vehicle notification information generated by an own vehicle to a nearby area;
a receiver configured to receive other vehicle notification information transmitted by each of one or more other vehicles;
a storage device storing a program; and
a hardware processor,
wherein the hardware processor is configured to execute the program stored in the storage device to determine the other vehicle which is to communicate with the own vehicle based on both of the own vehicle notification information transmitted by the transmitter and the other vehicle notification information received by the receiver,
wherein the own vehicle notification information includes identification information of the own vehicle and a communication strength with one or more vehicles viewed from the own vehicle and a communication quality with the one or more vehicles viewed from the own vehicle, which are acquired by the own vehicle, and
wherein the other vehicle notification information includes identification information of the other vehicle and a communication strength with the own vehicle viewed from the other vehicle and a communication quality with the one or more vehicles viewed from the own vehicle, which are acquired by the other vehicle.

2. The in-vehicle communication device according to claim 1, wherein the hardware processor is configured to cause the transmitter to transmit the own vehicle notification information on a broadcast channel.

3. The in-vehicle communication device according to claim 2, wherein the hardware processor is configured to cause the transmitter to transmit the own vehicle notification information as data of a system information block on the broadcast channel.

4. The in-vehicle communication device according to claim 1, wherein the indicator value is determined based on one or both of communication strength and communication quality between the own vehicle and the other vehicle.

5. The in-vehicle communication device according to claim 1, wherein the hardware processor is configured to determine the other vehicle which is to communicate with the own vehicle based on a sum or a weighted sum of an indicator value included in the own vehicle notification information and an indicator value included in the other vehicle notification information.

6. An in-vehicle communication device comprising:
a receiver configured to receive other vehicle notification information transmitted by another vehicle;
a storage device storing a program; and
a hardware processor,
wherein the hardware processor is configured to execute the program stored in the storage device to determine the other vehicle which is to communicate with the own vehicle based on own vehicle notification information generated by an own vehicle and the other vehicle notification information received by the receiver, and
wherein the own vehicle notification information includes identification information of the own vehicle and a communication strength with one or more vehicles viewed from the own vehicle and a communication quality with the one or more vehicles viewed from the own vehicle, which are acquired by the own vehicle, and
wherein the other vehicle notification information includes identification information of the other vehicle and a communication strength with the own vehicle viewed from the other vehicle and a communication quality with the one or more vehicles viewed from the own vehicle, which are acquired by the other vehicle.

7. A communication method comprising:
transmitting, by a computer, own vehicle notification information generated by an own vehicle to a nearby area;
receiving, by the computer, other vehicle notification information transmitted by each of one or more other vehicles; and
determining, by the computer, the other vehicle which is to communicate with the own vehicle based on one or both of the transmitted own vehicle notification information and the received other vehicle notification information,
wherein the own vehicle notification information includes identification information of the own vehicle and a communication strength with one or more vehicles viewed from the own vehicle and a communication quality with the one or more vehicles viewed from the one vehicle, which are acquired by the own vehicle, and
wherein the other vehicle notification information includes identification information of the other vehicle and a communication strength with the own vehicle viewed from the other vehicle and a communication quality with the one or more vehicles viewed from the own vehicle, which are acquired by the other vehicle.

8. A computer-readable non-transitory storage medium storing a program for causing a computer to:
transmit own vehicle notification information generated by an own vehicle to a nearby area;
receive other vehicle notification information transmitted by each of one or more other vehicles; and
determine the other vehicle which is to communicate with the own vehicle based on both of the transmitted own vehicle notification information and the received other vehicle notification information,
wherein the own vehicle notification information includes identification information of the own vehicle and a communication strength with one or more vehicles viewed from the own vehicle and a communication quality with the one or more vehicles viewed from the own vehicle, which are acquired by the own vehicle, and
wherein the other vehicle notification information includes identification information of the other vehicle and a communication strength with the own vehicle viewed from the other vehicle and a communication quality with the one or more vehicles viewed from the own vehicle, which are acquired by the other vehicle.

* * * * *